US011914033B2

(12) United States Patent
Booij et al.

(10) Patent No.: US 11,914,033 B2
(45) Date of Patent: Feb. 27, 2024

(54) TRANSMITTING DEVICE FOR USE IN LOCATION DETERMINATION SYSTEMS

(71) Applicant: Sonitor Technologies AS, Oslo (NO)

(72) Inventors: Wilfred Edwin Booij, Oslo (NO); Arne Øyen, Oslo (NO)

(73) Assignee: Sonitor Technologies AS, Oslo (NO)

( * ) Notice: Subject to any disclaimer, the term of this patent is extended or adjusted under 35 U.S.C. 154(b) by 0 days.

(21) Appl. No.: 17/163,987

(22) Filed: Feb. 1, 2021

(65) Prior Publication Data

US 2021/0293951 A1 Sep. 23, 2021

Related U.S. Application Data

(63) Continuation of application No. 15/858,669, filed on Dec. 29, 2017, now Pat. No. 10,908,280.
(Continued)

(51) Int. Cl.
G01S 15/66 (2006.01)
G01S 5/02 (2010.01)
(Continued)

(52) U.S. Cl.
CPC .......... *G01S 15/66* (2013.01); *G01S 5/02585* (2020.05); *G01S 5/18* (2013.01); *G01S 5/30* (2013.01);
(Continued)

(58) Field of Classification Search
CPC .......... G01S 15/66; G01S 5/0257; G01S 5/18; G01S 5/30; G01S 7/003; G01S 7/006;
(Continued)

(56) References Cited

U.S. PATENT DOCUMENTS 9,041,529 B2 5/2015 Booij et al.
10,126,407 B1 11/2018 Amir et al.
(Continued)

FOREIGN PATENT DOCUMENTS

AU 2008320647 A1 5/2009
AU 2018283787 A1 * 1/2020 .............. G01S 11/16
(Continued)

OTHER PUBLICATIONS

Translation of KR 20140044830 (Year: 2014).*
(Continued)

*Primary Examiner* — Daniel Pihulic
(74) *Attorney, Agent, or Firm* — Sterne, Kessler, Goldstein & Fox P.L.L.C.

(57) ABSTRACT

An acoustic location determination system is disclosed. The system includes one or more transmitting devices and one or more mobile devices. The transmitting device includes a first transducer configured to transmit first acoustic signals having a first frequency, and a second transducer configured to transmit second acoustic signals having a second frequency. The transmitting device further includes a beacon device configured to transmit beacon data via a short-range wireless communication technique. The transmitting device further includes one or more control devices configured to select the first or second acoustic signals based at least in part on one or more operating capabilities of one or more mobile units associated with the real-time locating system. The one or more control devices are further configured to cause transmission of the selected acoustic signals and the beacon data.

20 Claims, 8 Drawing Sheets

Related U.S. Application Data

(60) Provisional application No. 62/542,397, filed on Aug. 8, 2017, provisional application No. 62/518,455, filed on Jun. 12, 2017.

(51) Int. Cl.

| | | |
|---|---|---|
| *G01S 5/18* | (2006.01) | |
| *G01S 5/30* | (2006.01) | |
| *G01S 7/00* | (2006.01) | |
| *G01S 11/16* | (2006.01) | |
| *G01S 15/42* | (2006.01) | |
| *G01S 15/46* | (2006.01) | |
| *H04B 11/00* | (2006.01) | |

(52) U.S. Cl.
CPC .............. *G01S 7/003* (2013.01); *G01S 7/006* (2013.01); *G01S 11/16* (2013.01); *G01S 15/42* (2013.01); *H04B 11/00* (2013.01); *G01S 2015/465* (2013.01)

(58) Field of Classification Search
CPC .... G01S 11/16; G01S 15/42; G01S 2015/465; H04B 11/00
See application file for complete search history.

(56) References Cited

U.S. PATENT DOCUMENTS

| | | | | |
|---|---|---|---|---|
| 10,908,280 | B2* | 2/2021 | Booij | G01S 5/0257 |
| 2003/0003866 | A1* | 1/2003 | Overy | H04B 11/00 455/403 |
| 2011/0018710 | A1 | 1/2011 | Booij et al. | |
| 2012/0326916 | A1 | 12/2012 | Kanner et al. | |
| 2013/0329525 | A1 | 12/2013 | Lavery et al. | |
| 2015/0310770 | A1 | 10/2015 | Booij et al. | |
| 2016/0249160 | A1 | 8/2016 | Shinotsuka et al. | |
| 2016/0356876 | A1 | 12/2016 | Lazik et al. | |
| 2017/0135063 | A1 | 5/2017 | Bartov et al. | |
| 2018/0356520 | A1* | 12/2018 | Booij | G01S 5/30 |
| 2019/0272348 | A1 | 9/2019 | Booij et al. | |
| 2021/0293951 | A1* | 9/2021 | Booij | G01S 7/003 |

FOREIGN PATENT DOCUMENTS

| | | | | |
|---|---|---|---|---|
| CA | 2703879 | C | 1/2018 | |
| CA | 3067142 | A1 * | 12/2018 | .............. G01S 11/16 |
| CN | 105203996 | A | 12/2015 | |
| CN | 111164448 | A * | 5/2020 | .............. G01S 11/16 |
| EP | 3639052 | B1 * | 4/2021 | .............. G01S 11/16 |
| EP | 3885784 | A1 * | 9/2021 | .............. G01S 11/16 |
| ES | 2878129 | T3 * | 11/2021 | .............. G01S 11/16 |
| KR | 20140044830 | A | 4/2014 | |
| WO | WO-2018229636 | A1 * | 12/2018 | .............. G01S 11/16 |
| WO | WO 2018229636 | A1 | 12/2018 | |

OTHER PUBLICATIONS

Translation of KR CN 105203996 (Year: 2015).*
European Search Report dated Aug. 18, 2021 for Appl. No. EP 21 16 9513.5, 7 pages.
Gonzalez, J.R., et al., "Accuracy of Spread Spectrum Techniques for Ultrasonic Indoor Location," *Proc. of the 2007 15th Int'l. Conf. on Digital Signal Processing (DSP 2007)* IEEE, PI, Jul. 1, 2007) pp. 284-287, XP031125550, ISBN: 978-1-4244-0881-8.
International Search Report dated Nov. 20, 2018 for Appl. No. PCT/IB2018/054217, 7 pages.
Written Opinion dated Nov. 20, 2018 for Appl. No. PCT/IB2018/054217, 11 pages.
Korean Intellectual Property Office Notice of Preliminary Rejection directed to related Korean Application No. 10-2020-7000645, dated Jul. 19, 2023, with English-language translation attached; 18 pages.
Chinese National Intellectual Property Administration Office Action directed to related Chinese Application No. 201880051753.1, dated Feb. 23, 2023, with English-language translation attached; 22 pages.

* cited by examiner

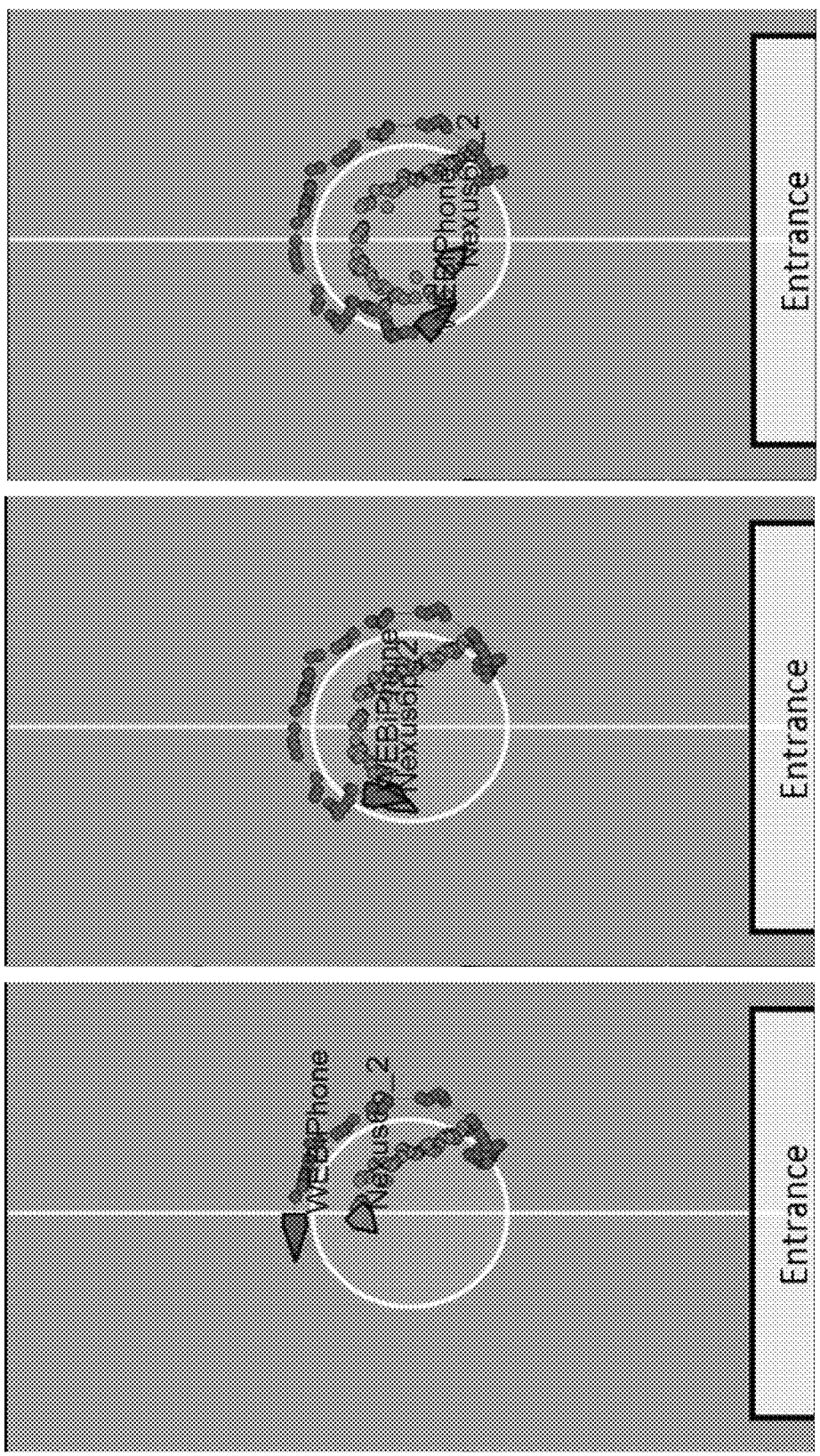

TRANSMITTING DEVICE FOR USE IN LOCATION DETERMINATION SYSTEMS

CROSS REFERENCE TO RELATED APPLICATIONS

This application is a continuation of U.S. patent application Ser. No. 15/858,669, filed on Dec. 29, 2017, entitled "Transmitting Device for Use in Location Determination Systems," which claims the benefit of U.S. Provisional Application No. 62/542,397, filed Aug. 8, 2017 and entitled "Acoustic Location Determination System," and claims the benefit of U.S. Provisional Application No. 62/518,455 filed Jun. 12, 2017 and entitled "Transmitting Device for Use in Location Determination Systems," all of which are incorporated herein by reference in their entirety.

FIELD

The present disclosure relates generally to real-time locating systems and more particularly to transmitting devices for use in real-time locating systems.

BACKGROUND

In recent years, real-time locating systems, such as indoor positioning systems, have found increased popularity and application. It is known to provide room-level location using static ultrasonic transmitters at known locations within an environment such as a building or other structure. Such transmitters can be used to transmit acoustic signals that may be received by one or more mobile receiver units located within the broadcast range of the ultrasonic transmitters. A location of the mobile receiver units may be determined based at least in part on the positions of the static transmitter units and the times of arrival of the acoustic signals at the mobile units.

SUMMARY

Aspects and advantages of embodiments of the present disclosure will be set forth in part in the following description, or may be learned from the description, or may be learned through practice of the embodiments.

One example aspect of the present disclosure is directed to a transmitting device associated with a real-time locating system. The transmitting device includes a first transducer configured to transmit first acoustic signals having a first frequency. The transmitting device further includes a second transducer configured to transmit second acoustic signals having a second frequency. The transmitting device further includes a beacon device configured to transmit beacon data via a short-range wireless communication technique. The transmitting device further includes one or more control devices configured to select the first or second acoustic signals based at least in part on one or more operating capabilities of one or more mobile units associated with the real-time locating system. The one or more control devices are further configured to cause transmission of the selected acoustic signals and the beacon data.

Other aspects of the present disclosure are directed to systems, apparatus, tangible, non-transitory computer-readable media, user interfaces, and devices for providing real-time location.

These and other features, aspects, and advantages of various embodiments will become better understood with reference to the following description and appended claims.

The accompanying drawings, which are incorporated in and constitute a part of this specification, illustrate embodiments of the present disclosure and together, with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 6A-6I depict an example demonstration of an example real-time locating system according to example embodiments of the present disclosure.

DETAILED DESCRIPTION

Figure 1:
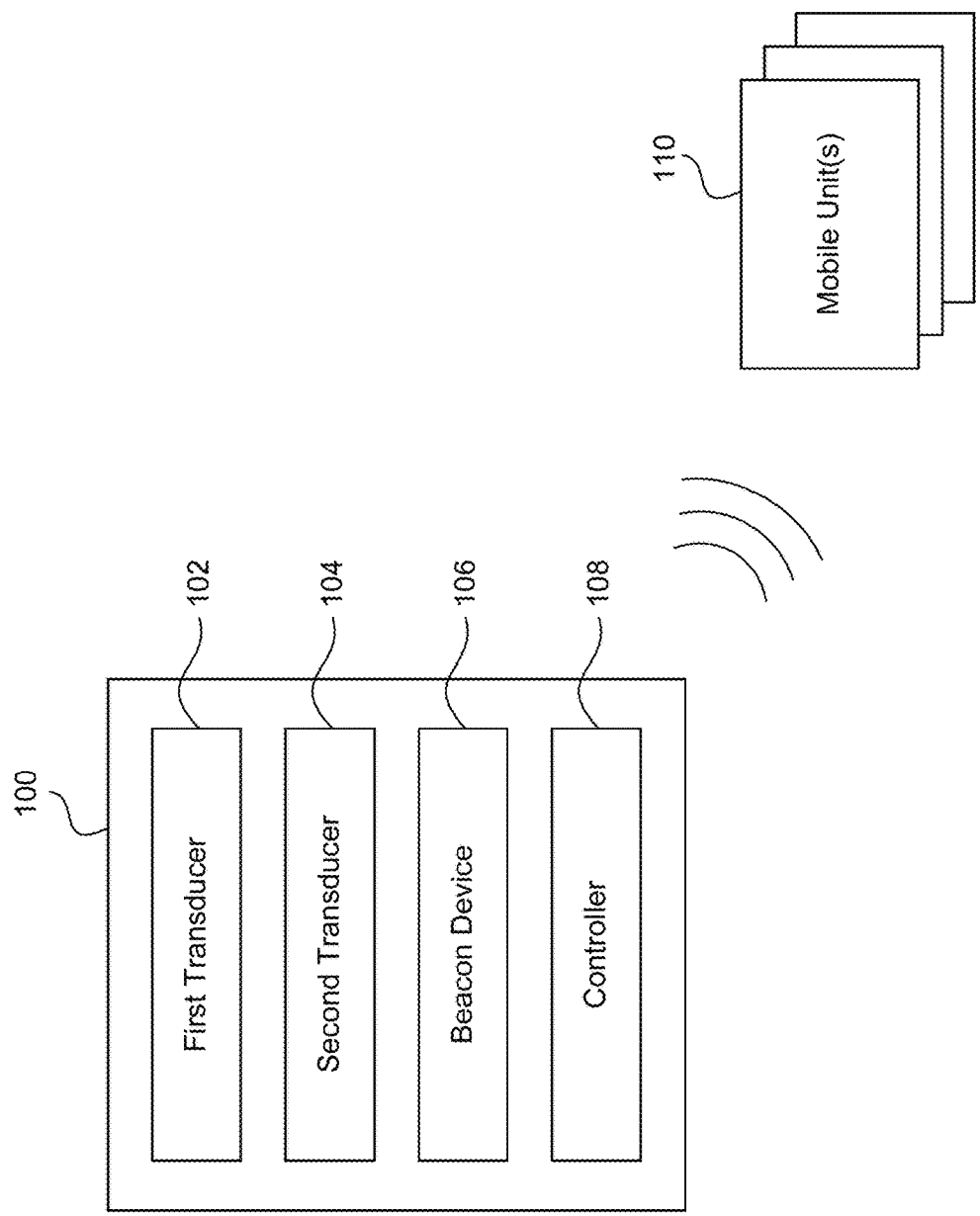
FIG. 1 depicts an example transmitting device for use in a real-time locating system according to example embodiments of the present disclosure.

The inventors recognized what is needed are ultrasonic real-time locating systems that can better handle different types of mobile receiver units. One problem has been it can be difficult to include a variety of types of mobile units within a particular real-time locating system due in part to the varying operational capabilities of the various types of mobile units. For instance, some mobile units, such as smartphones, tablets or other such consumer products are not configured to receive ultrasonic signals much higher than 20 kHz, whereas other mobile units, such as various mobile units used in industrial or healthcare applications, may be configured to receive ultrasonic signals having a higher frequency. Such operational capability discrepancies can make it difficult to achieve a flexible and accurate real-time locating system using a variety of mobile receiver units. Embodiments of the disclosure described herein overcome these difficulties and provide further advantages and features.

Reference will now be made in detail to embodiments, one or more examples of which are illustrated in the drawings. Each example is provided by way of explanation of the embodiments, not limitation of the invention. In fact, it will be apparent to those skilled in the art that various modification and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are directed to a transmitting device for use in a real-time locating system. For instance, the transmitting device may be configured to transmit acoustic signals such that the acoustic signals may be received by one or more mobile units. In some implementations, the transmitting device may be configured to transmit beacon data such that the beacon data may be received by the one or more mobile units. The acoustic signals may be ultrasonic acoustic signals (e.g. acoustic signals having a frequency greater than or equal to 20 kHz). In some implementations, the first and second acoustic signals can include identifying information associated with the transmitting device and/or location information indicating a location of the transmitting device within a particular subject area. For instance, the location data can indicate a location of the transmitting device within a particular room of a building.

More particularly, the transmitting device may include a first transducer and a second transducer. The first transducer may be configured to transmit first acoustic signals having a first frequency, and the second transducer may be configured to transmit second acoustic signals having a second frequency. In some implementations, the first frequency can be about 20 kHz, and the second frequency can be about 40 kHz. As used herein, the term "about," when used in conjunction with a numerical value is intended to refer to within 40% of the numerical value. It will be appreciated that other suitable frequencies can be used without deviating from the scope of the present disclosure. Typically the acoustic signals have a narrow band nature due to the use of highly efficient acoustic transducers to obtain adequate battery life. This means that the bandwidth of the acoustic signals is between 5-10% of the carrier frequency.

The transmitting device may further include a beacon device configured to transmit the beacon data. In some implementations, the beacon device can be implemented within the transmitting device. The beacon device may be any suitable beacon device configured to provide beacon data using any suitable wireless communication techniques. For instance, the beacon device can be a radio frequency beacon device (e.g. Bluetooth Low Energy (BLE) beacon device, Bluetooth beacon device, WiFi beacon device, WiFi Direct beacon device, near field communications beacon device, ZigBee beacon device, etc.), an infrared beacon device, or other suitable beacon device. In this manner, the beacon device can include a suitable transmitting device configured to transmit (e.g. broadcast using a suitable short-range wireless communication technology) beacon data. The beacon data can include data indicative of an identification of the transmitting device and/or data indicative of a location of the transmitting device. In some implementations, the location data included in the beacon data can be a relative location of the transmitting device within a particular subject area. The beacon data may also include information involving timing of the transmissions be it RF, ultrasonic or other.

The real-time locating system may be, for instance, an indoor positioning system. More particularly, the real-time locating system may include the transmitting device and one or more mobile units. The mobile units can be any user device, such as a smartphone, tablet computer, laptop computer, wearable computing device, or any other suitable user device capable of being carried by a user while in operation. In some implementations, the mobile units can be dedicated positioning tags configured to be affixed or attached to a person, object, or item. Such positioning tags can be operable to communicate with the transmitting device to determine a location of the positioning tags (and the corresponding person(s), object(s), or item(s) to which the positioning tags are attached.

In this manner, the transmitting device may be configured to transmit the acoustic signals and/or the beacon data within a subject area, such that one or more mobile units within the broadcast range of the transmitting device can receive the transmitted acoustic signals and/or beacon data. In some implementations, a mobile unit that receives the acoustic signals and/or beacon data can then determine a location of the mobile unit within the subject area. In some implementations, the mobile unit can provide the acoustic signals and/or beacon data to a server (e.g. via suitable wired and/or wireless communication), such that the server can determine the location of the mobile unit within the subject area based at least in part on the acoustic signals and/or beacon data.

In particular, the real-time locating system of the present disclosure may be used to determine a location, orientation and/or direction of one or more mobile units. The location, orientation, and/or direction of a mobile unit can be relative with respect to a subject area. For instance, the location of the mobile unit can be a location within a subject area. More particularly, the location can be determined with respect to the layout and dimensions of the subject area and/or a building or other entity in which the subject area is located. The location can be a three-dimensional (3D) location specifying an x-coordinate, a y-coordinate, and a z-coordinate with respect to a 3D space. In some implementations, the location can be a two-dimensional location. Aspects of the present disclosure can provide a location determination of a mobile unit that is accurate within about 6 inches to about 12 inches.

In some implementations, the transmitting device may determine whether to transmit first acoustic signals having a first frequency or second acoustic signals having a second frequency (or both) based at least in part on the capabilities of one or more mobile units associated with the real-time locating system. For instance, a selection of the first or second acoustic signals can be made based at least in part on one or more microphones (or other suitable transducers) included within the mobile units associated with the real-time locating system. As indicated above, the first acoustic signals (provided by the first transducer) can have a frequency of about 20 kHz and the second acoustic signals (provided by the second transducer) can have a frequency of about 40 kHz.

The determination of which acoustic signals to transmit (and thereby which transducer to use to transmit the signals) may be predetermined based at least in part on the known capabilities of the mobile units associated with the real-time locating system. For instance, conventional smartphones include microphones operable to receive acoustic signals having a frequency of 20 kHz. If it is known that the mobile units associated with the real-time locating system include smartphones (or other suitable mobile units operable to receive 20 kHz frequencies), the transmitting device may be operated to provide the first acoustic signals via the first transducer. In some implementations, such acoustic signal determination can be made manually by a user or other person associated with the real-time locating system, for instance, through an interaction with a user interface associated with a computing device (e.g. one or more of the computing devices described with respect to FIG. 3) associated with the real-time locating system. In some implementations, the acoustic signal determination can be performed automatically based at least in part on a look-up function performed by a computing device (e.g. one or more of the computing devices described with respect to FIG. 3) associated with the real-time locating system. More particularly, the computing device can access a look-up table specifying information to be used in the determination of the acoustic signals. Such look-up table can include, for instance, characteristics and/or capabilities of the mobile units associated with the real-time locating system. For instance, the look-up table can specify microphone types, characteristics, capabilities, etc. of various suitable mobile units. In some implementations, the look-up table can specify a particular frequency or transducer to use in transmitting the acoustic signals. The look-up function can be predetermined or can be determined in real-time. For instance, the transmitting device can communicate with a mobile unit to determine an identity of the mobile unit. The transmitting device can then perform the look-up function based on the identity.

The location, orientation, and/or direction of a mobile unit may be determined based at least in part on the acoustic signals received by the mobile unit. It will be appreciated that the such information may be determined using various suitable location determination techniques. For instance, the location, orientation, and/or direction of the mobile unit can be determined based at least in part on a time of flight (TOF), time difference of arrival (TDOA), angle of arrival (AOA), etc. using trilateration, multilateration, triangulation, or other suitable technique. In some implementations, the location, orientation, and/or direction of a mobile unit can be determined based at least in part on one or more position sensors implemented within or otherwise associated with the mobile unit. For instance, such information can be determined or refined using one or more accelerometers, gyroscopes, inertial measurement units, etc. located within the mobile unit, for instance, using suitable sensor fusion techniques.

In some implementations, the location, orientation, and/or direction of a mobile unit may be determined based at least in part on the beacon data provided by the transmitting device. For instance, the beacon data can be used in conjunction with the acoustic signals and/or position sensor data to determine the location, orientation, and/or direction of the mobile unit. In such implementations, the beacon data can be used by the mobile device to determine a course estimate of the location, orientation and/or direction of the mobile unit, which can be refined based at least in part on the acoustic signals and/or position sensor data. In some implementations, the beacon data can be utilized as a backup to the acoustic signals. For instance, if the acoustic signals cannot be used to determine the location of the mobile unit (e.g. if the microphone(s) on the mobile unit do not receive the acoustic signals), the beacon data can be used to determine the location orientation and/or direction of the mobile unit. Generally, the location, orientation, and/or direction of the mobile unit determined from the beacon data will not be as accurate as the location, orientation, and/or direction as determined using the acoustic signals.

As indicated above, the real-time locating system of the present disclosure provides a more accurate and efficient locating system relative to conventional real-time locating systems. More particularly, the real-time locating system of the present disclosure provides increased accuracy of within about 6 inches to about 12 inches. In this manner, the location of the mobile units can be determined on a room-by-room basis and/or on a sub-room basis, which can allow for a more accurate location tracking. Such real-time locating system requires less processing power, and a less complex infrastructure that is smaller and easily scalable. Such real-time locating system further provides near real-time latency by utilizing numerous location determination techniques (e.g. using acoustic signals, position sensor data, and/or beacon data). Such real-time locating system further provides an increased flexibility by allowing the use of various types of mobile units, as well as having the capability to provide multiple acoustic signals having multiple frequencies to accommodate for such various mobile units.

The real-time locating system of the present disclosure may be used in a number of applications, such as location tracking, work flow, mobile equipment tracking, safety and compliance (e.g. hand hygiene compliance, temperature monitoring, door locking for infant abduction protection, wander management, wayfinding, mobile equipment management, staff location determination, etc.) or other suitable application. For instance, the real-time locating system of the present disclosure can be configured to provide wayfinding information by providing routing instructions, step-by-step directions, etc. to a user from an origin to a destination. In some implementations, such wayfinding application can be used in conjunction with a mapping or routing application associated a mobile unit of a user to facilitate the wayfinding with respect to a map of a building, area, geographic region, etc. One example field of use is within the health care industry. For instance, a real-time location system of the present disclosure can be implemented within a hospital to provide patient tracking, patient flow, etc.

With reference now to the figures, example aspects of the present disclosure will be discussed in greater detail. For instance, FIG. 1 depicts an example transmitting device 100 for use in a real-time locating system according to example embodiments of the present disclosure. Transmitting device 100 includes a first transducer 102, a second transducer 104 and a beacon device 106. The first transducer 102 and the second transducer 104 can be any suitable transducers configured to transmit acoustic signals. More particularly the first transducer 102 can be configured to transmit first acoustic signals at a first frequency (e.g. about 20 kHz) and the second transducer 104 can be configured to transmit second acoustic signals at a second frequency (e.g. about 40 kHz). As indicated, the acoustic signals can include data indicative of an identity of the transmitting device 100 and/or data indicative of a location of the transmitting device 100. The beacon device 100 may be powered from a batteries and be capable of operating for several years. Alternatively, the unit may be powered by means of a cable, for example using power over Ethernet or mains.

The beacon device 106 may be any suitable beacon device configured to transmit beacon data using a suitable short-range wireless communication technology. For instance, the beacon device 106 may be a BLE beacon device, WiFi beacon device, infrared beacon device, or other suitable beacon device. As indicated, the beacon data can include data indicative of an identity of the transmitting device 100 and/or data indicative of a location of the transmitting device 100.

The transmitting device 100 may further include a controller 108 configured to cause the first transducer 102 and/or the second transducer 104 to transmit acoustic signals, and to cause the beacon device 106 to transmit the beacon data. The controller 108 can include one or more processors and one or more memory devices. The one or more processors can include any suitable processing device, such as a microprocessor, microcontroller, integrated circuit, logic device, one or more central processing units (CPUs), graphics processing units (GPUs), and/or other processing devices, such as a system on a chip (SoC). The one or more memory devices can include one or more computer-readable media, including, but not limited to, non-transitory computer-readable media, RAM, ROM, hard drives, flash memory, or other memory devices. The one or more memory devices can store information accessible by the one or more processors, including instructions that can be executed by the one or more processors. The instructions can include various aspects of any of the techniques or methods disclosed herein. The one or more memory devices can also include data that can be retrieved, manipulated, created, or stored by the one or more processors.

In some implementations, the controller 108 may cause the acoustic signals and/or the beacon data to be transmitted periodically or in another suitable manner. In some implementations, the controller 108 can be configured to perform a look-up function to determine whether to transmit the first acoustic signals or the second acoustic signals. More particularly, the controller 108 can access a look-up table that specifies one or more operating capabilities associated with various suitable mobile units that are compatible with the transmitting device 100 and/or the real-time locating system. For instance, in some implementations, the mobile unit(s) 110 can provide identifying data of the mobile unit(s) 110 to the transmitting device 100. The controller 108 can perform the look-up function based at least in part on the identifying data. The controller 108 can then select the first acoustic signals associated with the first transducer 102 or second acoustic signals associated with the second transducer 104. The controller 108 can then cause the transmission of the selected acoustic signals by the corresponding transducer.

As indicated, the controller 108 may further cause the transmission of beacon data by the beacon device 106. Such transmission of beacon data can occur separate from the transmission of the acoustic signals, or concurrently with (or prior to) the transmission of the acoustic signals. In some implementations, the beacon data can be transmitted such that the mobile unit(s) 110 that receive the beacon data can determine the location, orientation, and/or direction of the mobile unit based at least in part on both the beacon data and the acoustic signals. In some implementations, the beacon data can be used to implement a backup location determination technique in the event that the location, orientation, and/or direction of the mobile unit(s) 110 cannot be determined using the acoustic signals.

Figure 2:
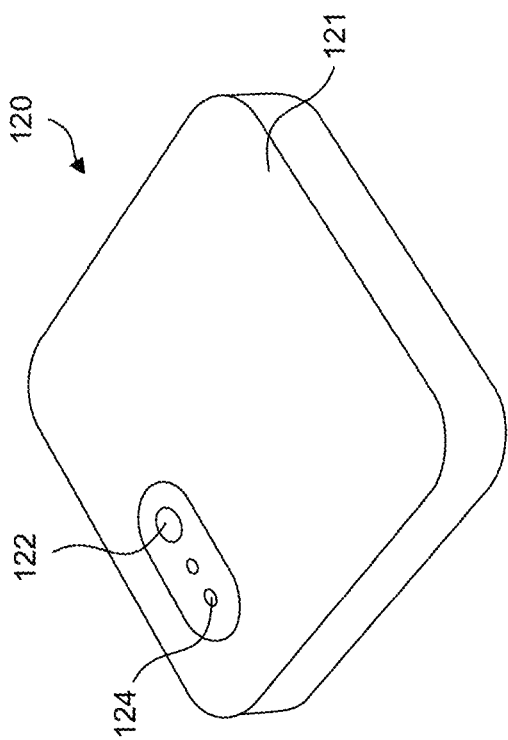
FIG. 2 depicts an external view of an example transmitting device for use in a real-time locating system according to example embodiments of the present disclosure.

FIG. 2 depicts an example transmitting device 120 for use in a real-time locating system according to example embodiments of the present disclosure. The transmitting device 120 may correspond to the transmitting device 100 of FIG. 1 or other suitable transmitting device. More particularly, FIG. 2 depicts an external view of the transmitting device 120. The transmitting device 120 includes housing 121 that surrounds and protects the sensitive internal components of the transmitting device 120. As shown, the transmitting device 120 includes a first transducer 122 and a second transducer 124. The first transducer 122 can be configured to provide acoustic signals having a frequency of about 20 kHz. The second transducer 124 can be configured to provide acoustic signals having a frequency of about 40 kHz. In some implementations, the transmitting device 120 can further include a beacon device configured to transmit beacon data.

Figure 3:
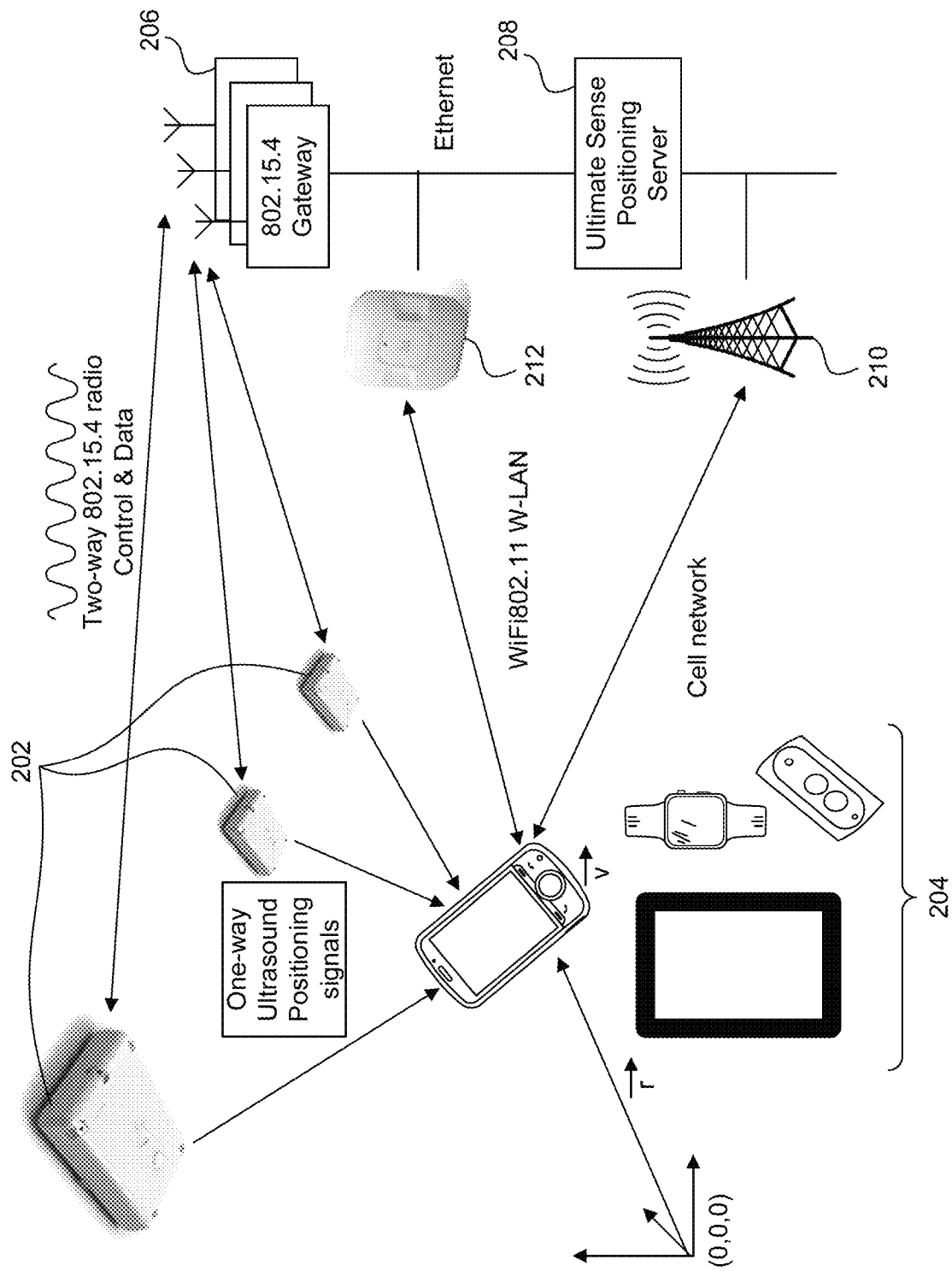
FIG. 3 depicts an overview of an example real-time locating system according to example embodiments of the present disclosure.

FIG. 3 depicts an example real-time locating system 200 according to example embodiments of the present disclosure. The real-time locating system 200 may be, for instance, an indoor positioning system deployed throughout a building or other structure. The real-time locating system 200 includes a plurality of fixed, static transmitting devices 202 having known locations. The transmitting devices 202 can be any suitable transmitting devices. For instance, the transmitting devices 202 can be configured to transmit acoustic and/or other (e.g. radio frequency) positioning signals and beacon data. In some implementations, the transmitting devices 202 can correspond to the transmitting devices 100 and/or 120 of FIGS. 1 and 2, respectively. The transmitting devices 202 can be stationed strategically throughout the building or structure to allow for a determination of the location of one or more mobile units 204 located within the building or structure. In this manner, the transmitting devices 202 can broadcast acoustic signals such that the acoustic signals can be received by the mobile units when the mobile units are located within a broadcast range of the transmitting devices 202.

The transmitting devices 202 may further communicate with a gateway device 206 associated with the real-time locating system 200. As shown, the real-time locating system 200 can include one or more gateway devices 206. The communication between the transmitting devices 202 and the gateway device 206 can be performed using any suitable wired and/or wireless communication technique. For instance, in some implementations, communication between the transmitting devices 202 and the gateway device 206 can be performed using wireless communication in accordance with the IEEE 802.15.4 standard. The gateway device 206 can be configured to monitor and regulate the health and maintenance and configuration of the real-time locating system 200. In some implementations, the gateway device 206 can have an associated user interface accessible by one or more users of the real-time locating system 200. Such interface can allow users to remotely view, interact with, manipulate, edit, etc. various suitable configurations, characteristics, or qualities of the real-time locating system 200. As shown, the mobile units 204 can further access the gateway device 206 via a suitable communications network, such as a wireless local area network 212. In some implementations, the gateway device 206 can be implemented within a transmitting device 202.

The real-time locating system 200 further includes a server device 208. The server device 208 may be accessible to the transmitting devices 202 and/or the mobile units 204. More particularly, as shown, the server device 208 is accessible to the transmitting devices 202 via the gateway device 206, and to the mobile units 204 via the wireless local area network 212 and/or a cellular network 210. In some implementations, the server device 208 can determine the location, orientation, and/or direction of the mobile units 204 based at least in part on one or more acoustic signals, beacon data and/or sensor data associated with the mobile units. For instance, a mobile unit 204 can provide the received acoustic signals and beacon data along with the sensor data to the server device 208, such that the server device 208 can determine the location, orientation, and/or direction of the mobile unit 204. In implementations wherein the mobile units 204 determine their own locations, orientations, and/or directions, the mobile units 204 can provide such information to the server device 208, such that the server device 208 can update the real-time locating system 200 with the additional information. In some implementations, the server device 208 can host the look-up table used to select the acoustic signals to provide to the mobile units 204.

As indicated, the mobile units 204 and/or the server 208 may be configured to determine the location, orientation and/or direction of the mobile units 204 based at least in part on the acoustic signals, beacon data and/or sensor data. In this manner, a mobile unit 204 can be configured to receive the acoustic signals and/or beacon data provided by one or more transmitting devices 202. The acoustic signals and/or beacon data can encode identifying information associated with the one or more transmitting devices 202 and/or location data associated with the one or more transmitting devices 202. Upon receipt of such data, the mobile device 204 and/or server 208 can be configured to decode the signals to extract the identifying and/or location information encoded in the signals. For instance, upon receipt of acoustic signals from a transmitting device 202, the mobile unit 204 can decode the signals using any suitable decoding techniques, such as various suitable digital signal processing techniques. The mobile unit 204 can then determine a location, orientation and/or direction of the mobile unit 204 based at least in part on the extracted information. For instance, the mobile unit 204 can determine the location, orientation, and/or direction using any suitable positioning techniques, such as by measuring the TOA, TDOA, TOF, etc. of the acoustic signals and using multilateration, trilateration, triangulation, etc.

It will be appreciated that the real-time locating system 200 depicted in FIG. 3 is intended for illustrative purposes only. It will be further appreciated that the real-time locating systems of the present disclosure can include various other suitable configurations or arrangements, and can utilize various other suitable communication techniques. More particularly, the real-time locating system 200 can include any suitable number of transmitting devices 202 arranged in various suitable configurations to facilitate the determination of the locations of any suitable number of mobile units 204.

Figure 4:
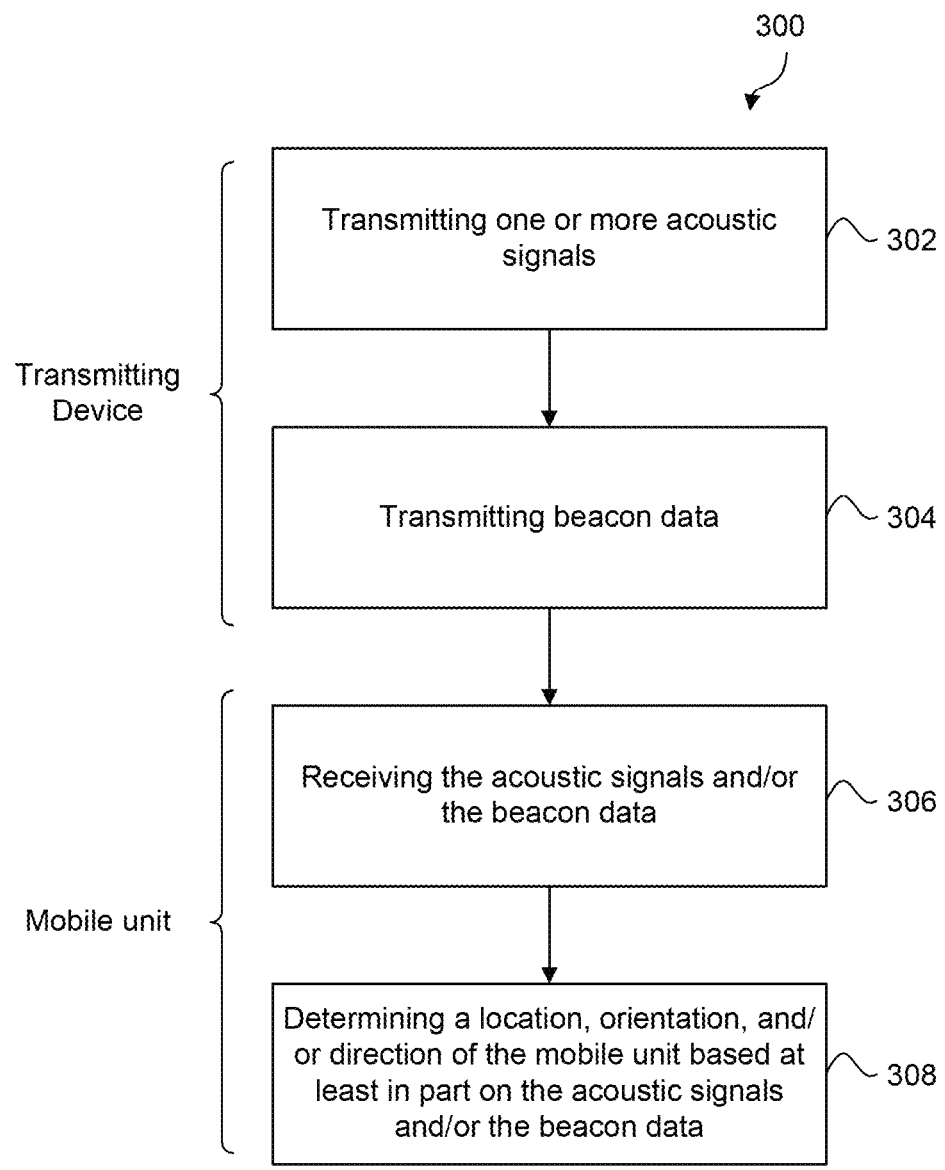
FIG. 4 depicts a flow diagram of an example method of determining a location associated with a mobile unit according to example embodiments of the present disclosure.

FIG. 4 depicts a flow diagram of an example method (300) of determining a location, orientation, and/or direction of a mobile unit according to example embodiments of the present disclosure. The method (300) may be implemented by one or more computing devices, such as one or more of the computing devices described with respect to FIG. 1. In addition, FIG. 4 depicts steps performed in a particular order for purposes of illustration and discussion. Those of ordinary skill in the art, using the disclosures provided herein, will understand that the steps of any of the methods described herein can be adapted, rearranged, expanded, omitted, or modified in various ways without deviating from the scope of the present disclosure.

At (302), the method (300) may include transmitting one or more acoustic signals by a transmitting device associated with a real-time locating system. For instance, the transmitting device can be transmitting device 100 depicted in FIG. 1 or other transmitting device. In this manner, the transmitting device may include two or more transducers, each configured to transmit acoustic signals having different frequencies. The acoustic signals may include identifying information associated with the transmitting device, and/or location information associated with the transmitting device.

At (304), the method (300) may include transmitting, by the transmitting device, beacon data. As indicated, the transmitting device can further include a beacon device configured to transmit beacon data using a suitable short-range wireless communication technology (e.g. BLE, WiFi Direct, ZigBee, etc.). Such beacon device can be configured to transmit the beacon data. The beacon data can include location information associated with the transmitting device and/or identity information associated with the transmitting device.

At (306), the method (300) may include receiving, by a mobile unit associated with the real-time locating system, the acoustic signals and/or beacon data. For instance, a suitable mobile unit can be configured to receive such information while located within the broadcast range of the transmitting device.

At (308), the method (300) may include determining a location, orientation, and/or direction of the mobile unit based at least in part on the acoustic signals and/or beacon data. In some implementations, the location, orientation, and/or direction of the mobile unit can further be determined based at least in part on sensor data determined by one or more position sensors (e.g. inertial measurement units) associated with the mobile unit. The location, orientation and/or direction of the mobile unit can be determined by the mobile unit or by a server device associated with the real-time locating system. For instance, when determined by the server device, the mobile unit can provide the acoustic signals, beacon data, and/or sensor data to the server device. As indicated above, the location orientation and/or direction of the mobile unit can be determined using any suitable techniques, such as by measuring the TOA, TDOA, TOF, etc. of the acoustic signals and using multilateration, trilateration, triangulation, etc.

Figure 5:
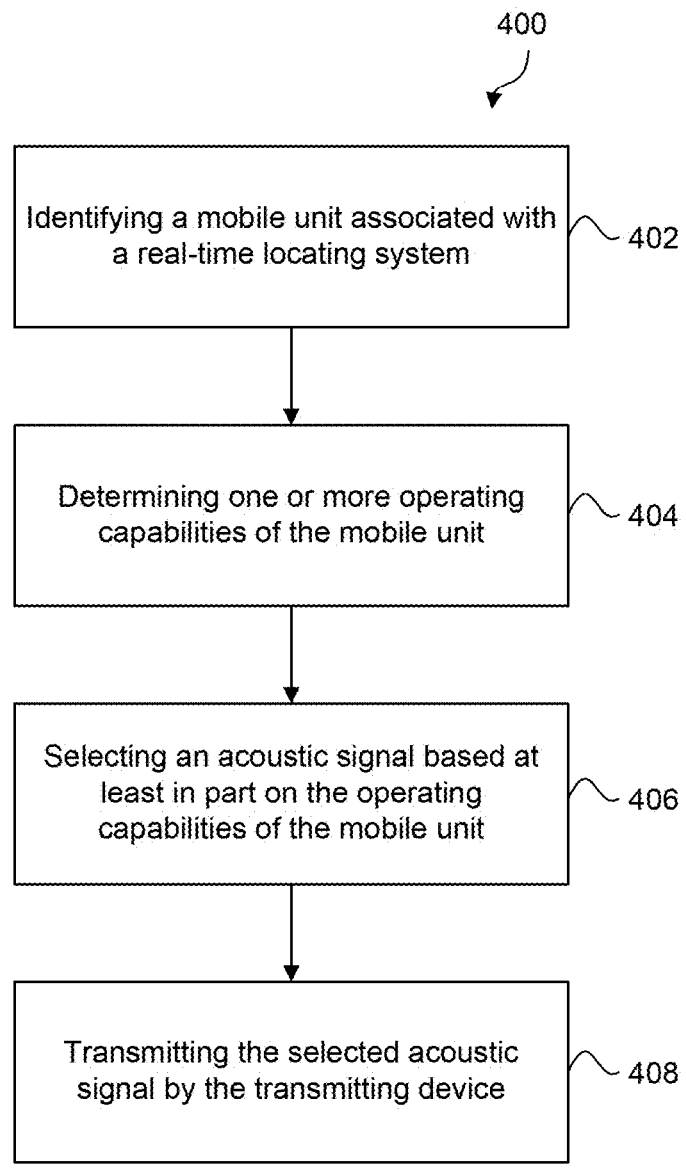
FIG. 5 depicts a flow diagram of an example method of selecting acoustic signals to be transmitted according to example embodiments of the present disclosure.
Figure 6A:
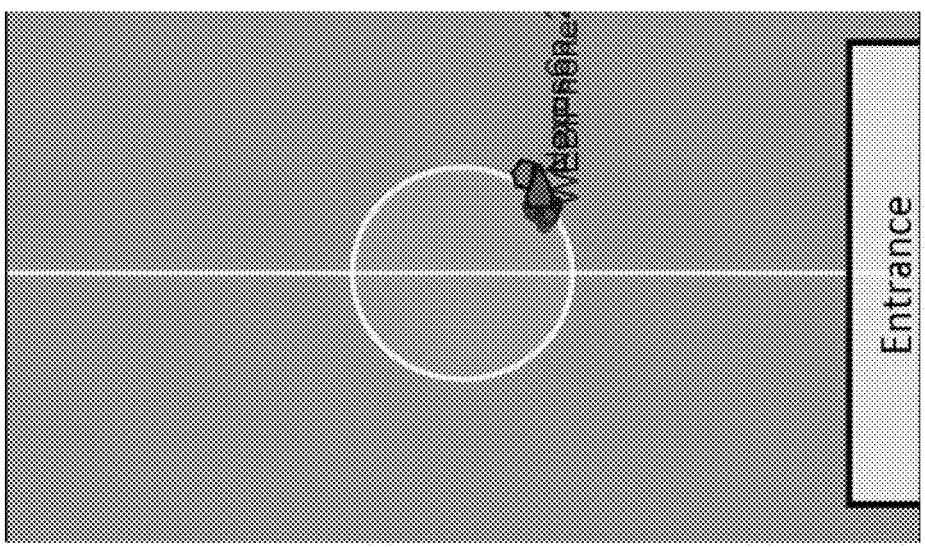
Figure 6B:
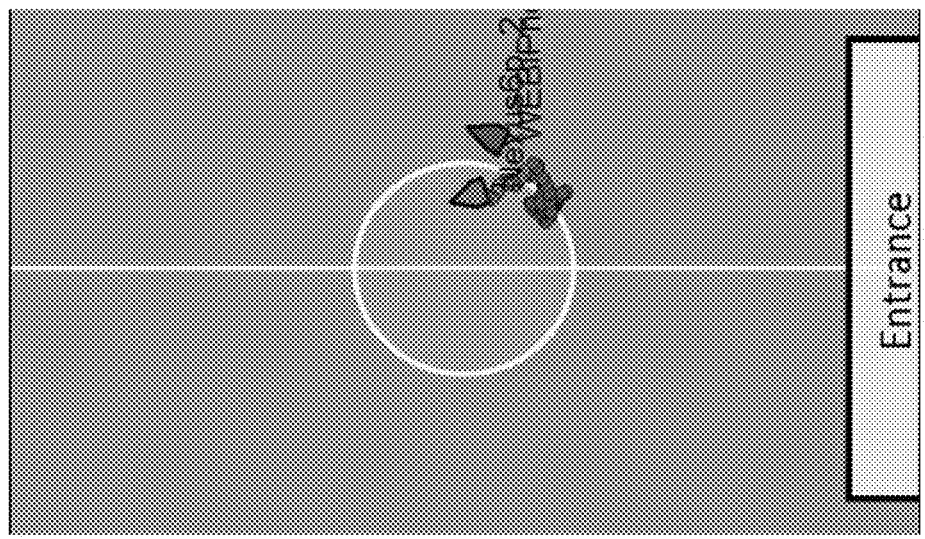
Figure 6C:
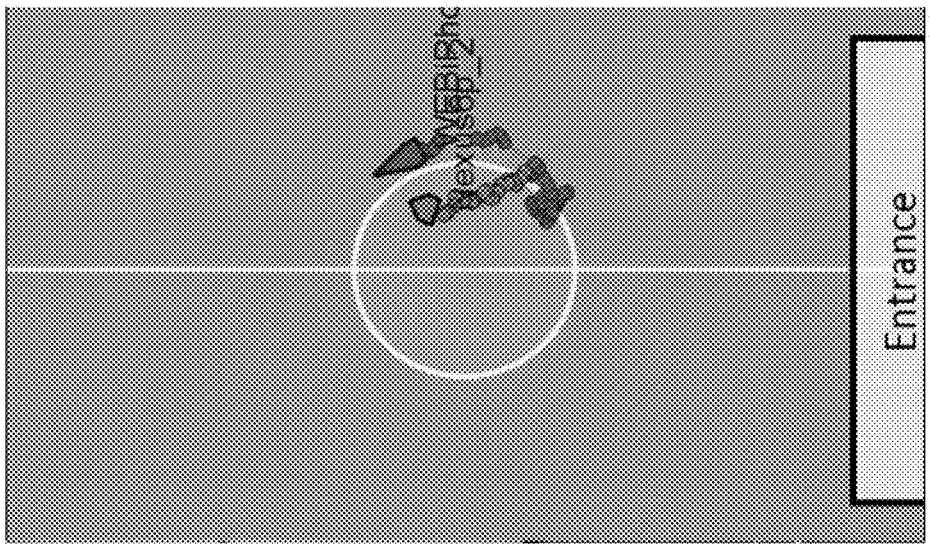
Figure 6I:
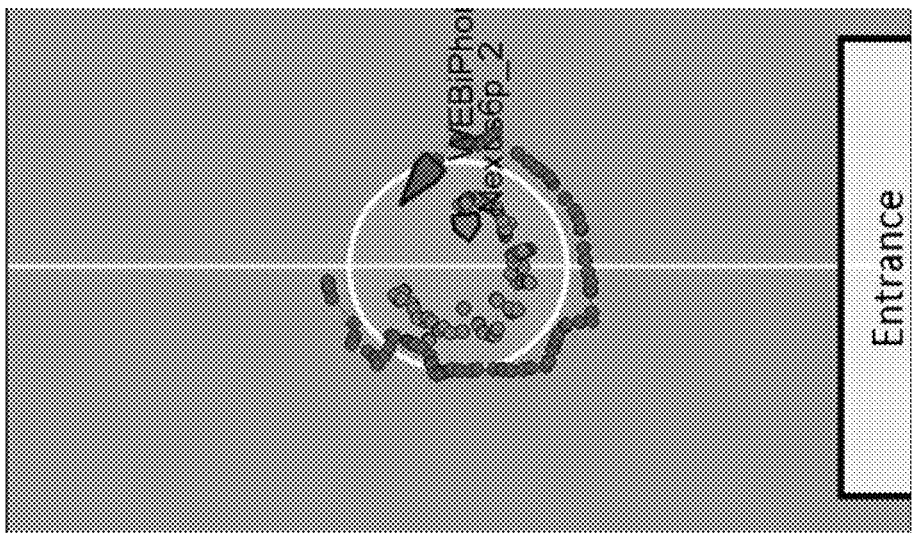
Figure 6H:
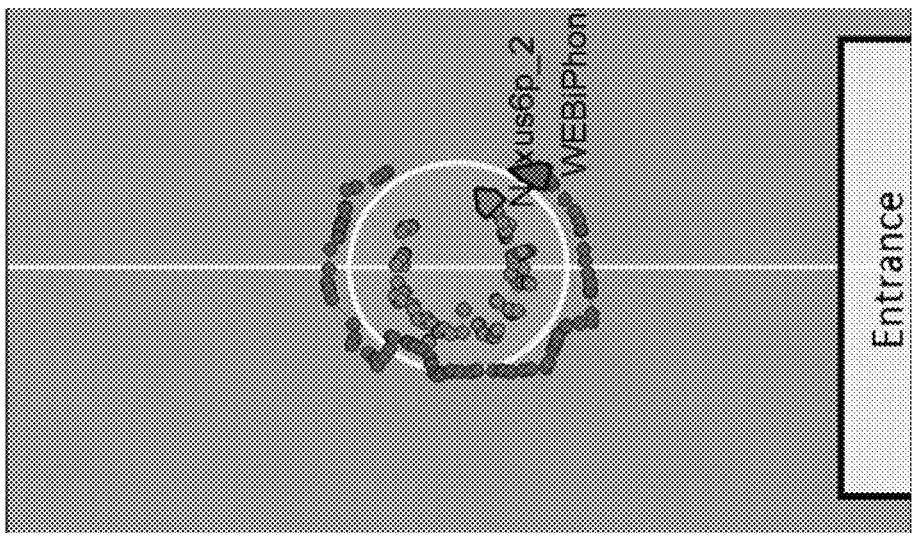
Figure 6G:
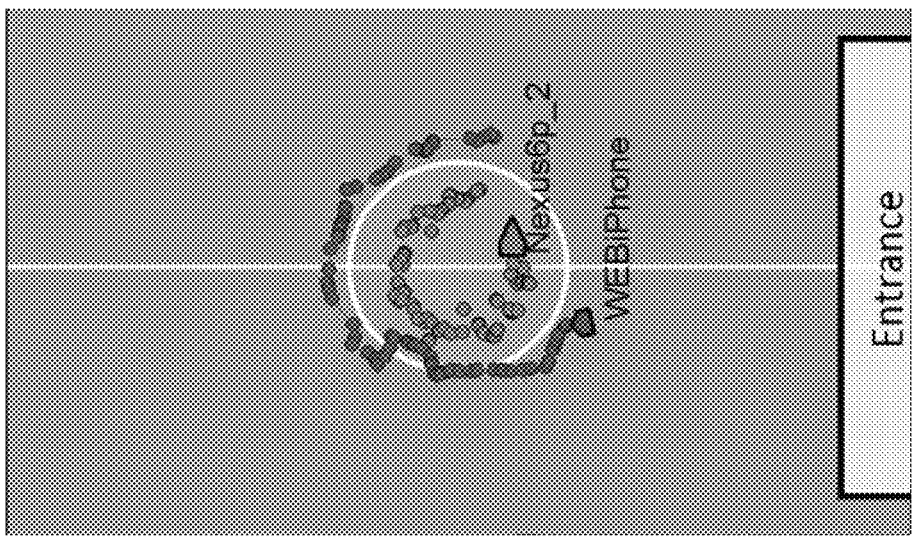

FIG. 5 depicts a flow diagram of an example method (400) for selecting acoustic signals to transmit by a transmitting device associated with a real-time locating system according to example embodiments of the present disclosure. The method (400) may be implemented by one or more computing devices, such as one or more of the computing devices described with respect to FIG. 1. In addition, FIG. 5 depicts steps performed in a particular order for purposes of illustration and discussion.

At (402), the method (400) may include identifying a mobile unit associated with a real-time locating system. For instance, in some implementation, information associated with a mobile unit of the real-time locating system can be known and stored in a database associated with the real-time locating system, or within the transmitting device. In such implementations, identifying the mobile unit can include accessing the database to determine an identity or type of the mobile unit. In some implementations, the identity or type of the mobile unit can be determined through communication with the mobile unit. In such implementations, identifying the mobile unit can include receiving information from the mobile unit specifying an identity or type of the mobile unit.

At (404), the method (400) may include determining one or more operating capabilities of the mobile unit. For instance, the operating capabilities of the mobile unit can be specified in a look-up table stored in a database associated with the real-time locating system, or within the transmitting device. The operating capabilities may specify or indicate a frequency that one or more microphones in the mobile unit are configured to receive. Determining the one or more operating capabilities of the mobile unit can include accessing the look-up table and performing a look-up function for the mobile unit.

At (406), the method (400) may include selecting an acoustic signal based at least in part on the operating capabilities of the mobile unit. The transmitting device can include multiple transducers, each configured to transmit acoustic signals having different frequencies. For instance, the transmitting device can include a first transducer configured to transmit acoustic signals at a first frequency (e.g. 20 kHz) and a second transducer configured to transmit acoustic signals at a second frequency (e.g. 40 kHz). Selecting an acoustic signal can include selecting a transducer with which to transmit the appropriate acoustic signals based at least in part on the operating capabilities of the mobile unit.

At (408), the method (400) may include transmitting the selected acoustic signal by the selected transducer associated with the transmitting device. The acoustic signal can be transmitted periodically, at interval, or in any other suitable manner.

Example Demonstration

FIGS. 6A-6I depict an example demonstration of a real-time locating system using acoustical signals and mobile devices carried out by the inventor according to an embodiment of the present invention. This demonstration was carried out to be illustrative and not intended to be necessarily limiting.

In the demonstration, a user is carrying two mobile devices, an iPhone™ (labeled WEBiPhone in FIGS. 6A-6I) mobile device and a Nexus6P™ (labeled Nexus6P_2 in FIGS. 6A-6I) mobile device in his right and left hands respectively. The user is operating the mobile devices in an environment that includes a real-time locating system according to an embodiment.

In this example demonstration, the user held the mobile devices one in each of his right and left hands separated by approximately 3-5 feet. The user stood inside a gymnasium on a basketball court. Holding the mobile devices apart just above waist level the user walked counterclockwise along a circular path and spiraled inward toward a center point of the circle. The user followed a circle on the basketball court walking counterclockwise keeping the mobile device in his left hand on the inside of the circle and the mobile device in his right hand on the outside of the circle.

FIGS. 6A-6I show a series of displays that depict the detected locations of the two mobile devices obtained in real-time during the demonstration. The outermost plot of points in the circle corresponds to the sensed location of the iPhone™ mobile device held in the user's right and as he walked counterclockwise. The innermost plot of points corresponds to the sensed location of the Nexus6P™ mobile device held in the user's left and as he walked counterclockwise. As evident in the plots of FIGS. 6A-6I, the real-time locations of the mobile devices were obtained indoors, using acoustic signals, at an accuracy of about 12 inches or less.

This demonstration is illustrative and not intended to be limiting. For example, the mobile devices themselves can operate as described above for mobile units 204 depicted in FIG. 3, or other suitable mobile devices. The mobile devices can be used with a real-time locating system such as real-time locating system 200 depicted in FIG. 3. As the user progresses along the path, the one or more transmitting devices (e.g. a transmitting device 202 depicted in FIG. 3, or other suitable transmitting devices) can provide acoustic signals and/or beacon data that is received by the mobile devices. The mobile devices can respectively determine the location of the mobile devices based at least in part on the acoustic signals and/or beacon data.

As shown in FIGS. 6A-6I, the mobile devices can be configured to track the location of the mobile devices as the user carrying the mobile devices progresses along the path. In this manner, the transmitting devices can periodically provide acoustic signals that can be received by the mobile devices. The mobile devices can then update the location of the mobile devices based at least on one or more of the received signals. Such updated locations can be used to track a path of the user (e.g. as the user progresses along the circle on the surface of the court). As indicated above, such tracking techniques can be used to provide wayfinding applications to the user, which can be used to provide routing instructions and/or step-by-step directions from an origin to a destination.

As shown in FIGS. 6A-6I, the real-time locating system of the present disclosure can facilitate determination of the location of the mobile devices within an accuracy of about 6 inches to about 12 inches, or less with sub-second updates rates. Such accuracy can allow for sophisticated location determination on a room-by room basis or a sub-room basis. Such sophisticated, detailed location determination can facilitate various suitable applications, such as any of the applications described above.

Additional Embodiments

As discussed above, embodiments of real-time location systems seek to provide location of a movable asset or a person by receiving a location specific signal. By decoding and forwarding that location specific information to a central server, the central server may determine the location of that specific movable asset or person. In such a real-time location system, each acoustic transmitter of a location specific signal is required to be configured to provide its location specific signal, and its transmissions of the location specific signal need to be coordinated so that whichever location tag of the movable asset or person is in range, the respective transmission and reception capabilities are synchronized in time. In particular, it is desirable that each location tag be configured to open a receive window that is applicable to all acoustic transmitting devices in the particular environment in which the real-time location system is operating. Thus, all acoustic transmitting devices in the particular environment in which the real-time location system are thereby configured to transmit during the same transmit window. By having all transmitting devices and location tags coordinated to operate on the same transmit/receive window schedule, battery life may be extended by having each of the respective devices sleep at all times other than the transmit/receive window. Alternatively, in the case where the acoustic signals transmitted do not support multiple access, the acoustic signals transmitted from individual beacon devices with an area with acoustic overlap may be distributed with known time offsets. Information on these offsets may advantageously be conveyed through a short-range RF transmission (e.g. BLE) from the transmitter device that is receivable by the mobile devices. The short-range RF transmissions from the transmitter devices can advantageously be coordinated by the central server to occur with some specific offset from a system time for each transmitter device. Again, these timing offsets of the RF transmission can be included as part of the beacon data and used by the mobile device to adjust its timing of receipt of either RF or acoustic receptions. In implementations where the relative latency of acoustic and short-range RF transmissions is controlled with 1 ms, the mobile device can use the delay between RF and acoustic transmissions to estimate the time of flight, greatly aiding the ability to position the device accurately. Commensurate with the location update times required in a real-time location system for environments such as office buildings, hospitals and the like, the transmit/receive window appears on a regular basis. In an exemplary embodiment, the transmit/receive window occurs at a frequency of 1 Hz, i.e., the window appears once per second.

As described above, FIG. 2 illustrates an exemplary real-time location system that uses acoustic signals to provide location signals to location tags in order for locations to be established. Server 208 provides overall control, configuration and synchronization management of the real-time location system. In some embodiments, server 208 also provides analysis of the location signals to determine location of reporting location tags. Server 208 is networked to all location transmitters 202 through the use of gateways 206. Each gateway 206 is connected to server 208 via a network connection, e.g., Ethernet.

Downlink Control, Configuration and Synchronization

Each gateway 206 is located in a location that can control a number of location transmitters 202. Such control is effected by using a 2-way wireless connection between gateway 206 and its dependent location transmitters 202. Factors affecting the design of the wireless connection include size of wireless footprint, cost of the resulting number of gateways 206 and power consumption used by location transmitters 202. In embodiments, location transmitters 202 are powered by batteries in order to reduce the installation cost of location transmitters 202 and permit flexibility of rapid deployment of location transmitters 202 in different locations. Such rapid deployment may be used when offices are changed during a new buildout. Suitable communications protocol for the 2-way wireless connection between gateway 206 and its dependent location transmitters 202 include a Zigbee connection (i.e., IEEE 802.15.4 connection). In an installation of thousands of location transmitters 202, the footprint of a Zigbee connection would require installation of hundreds of gateways 206 to provide the required footprint coverage. In an alternative, a communications protocol for the 2-way wireless connection between gateway 206 and its dependent location transmitters 202 include a Long Range (LoRa) connection. LoRa uses an orthogonal sequence spread spectrum-based (OSSS-based) radio technology to connect devices in its network. The use of OSSS is key to providing a scalable, high-capacity network, with very low energy consumption, while maintaining a simple and easy to rollout a star-based infrastructure. Implementations of an LoRa network operate in the globally available Industrial, Scientific and Medical bands, also referred to as ISM bands, and can co-exist in these bands with other radio technologies, without a substantial risk of collisions or capacity problems. Exemplary LoRa embodiments use the European ISM band at 868 MHz, or the 902-928 MHz band in the United States. LoRa's operation at the much lower frequencies than the 2.4 GHz frequency of the Zigbee protocol results in a much larger footprint than that provided by the equivalent Zigbee protocol. By virtue of the larger footprint, the number of gateways may be reduced by two orders of magnitude compared to that of the equivalent Zigbee protocol realization.

Other Acoustic Transmitter Devices

Location transmitters 202 provide coded information for receipt by location tags 204, where the coded information indicates the identities of those nearby location transmitters 202. Location transmitters 202 provide the coded information using acoustic signals for the reasons previously discussed. Various devices, in addition to dedicated acoustic transmitter devices, may be used to provide the required coded information for receipt by location tags 204. For example, smart devices such as televisions, tablets, smart-home hubs may be used to transmit the acoustic signals and beacon data signals. These smart devices include the required capability of RF communications capability, support beacon signal generation and transmission, and also include speakers that transmit acoustic (including ultrasound) signals. Even light switch covers may be enhanced by an embedded acoustic transmitter to become a location transmitter 202 for use in a real-time location system. Accordingly, through appropriate software (or hardware in the case of a light switch), such existing devices may be enabled as beacons for use in a real-time location system with very little cost. Thus, with very little effort, room-level location accuracy may be provided through the use of these re-configured smart devices. Furthermore, smart televisions and other fixed-mounted devices with good acoustic placement may be used to provide 3D-location information of mobile devices. In scenarios where these smart devices are in an isolated environment where real-time location determination is required, no synchronization of these smart devices is required. BLE capable devices can be synchronized through use4 of the Bluetooth data signal.

Location Tags

Location tags 204 are attached to movable assets or personnel whose location needs to be tracked. Location tags 204 receive coded information from nearby location transmitters 202, where the coded information indicates the identities of those nearby location transmitters 202. Location transmitters 202 provide the coded information using acoustic signals for the reasons previously discussed. For example, the propagation characteristics of acoustic signals more readily support room-based location determination since acoustic signals do not penetrate room walls. In addition to the need to receive the coded information, location transmitters 202 also need to receive configuration, control and synchronization information. Analysis of the available bandwidth of the acoustic signals indicates that additional bandwidth is required to support the configuration, control and synchronization functionality.

Beacon Data Signal

An additional signal pathway from location transmitters 202 to location tags 204 includes the use of a beacon signal. The beacon data signal is often pre-existing in offices, hospitals and other environments in which real-time location systems may be desired. Although the beacon data signal may penetrate walls and result in a much larger footprint than is suitable for real-time location in an office or similar environment, the beacon data signal may provide a coarse location of a particular location tag 204. Knowledge of a coarse location of a particular location tag 204 provides an advantage to location tag 204 since it reduces the number of possible location codes that location tag 204 needs to consider in decoding. A reduction in the number of possible location codes reduces the amount of processing (reduced power consumption) in order for the location determination to be made. The beacon data signal when provided by a Bluetooth Low Energy approach has a comparable footprint to the footprint associated with the acoustic signal transmitter device.

In various embodiments, the beacon data signal may provide information that reflects the subset of possible location codes in the vicinity of location tag 204 (or mobile communication device for which a location determination is desired). In other embodiments, the information reflects the subset of possible location codes in the vicinity of location tag 204 (or mobile communication device for which a location determination is desired), as well as the timeslots during which the subset of possible location codes are transmitted in the acoustic signals. The form of the information, whether a subset of possible location codes, or the subset of possible location codes together with the timeslots during which these possible locations codes are transmitted, include various forms. For example, the information may be in the form of a table of the subset of possible location codes and timeslots, or may be in the form of a link to the information. The location of the information may reside in the cloud, may reside in the server for the real-time location system, or may be downloaded as part of an acoustic model for a particular environment (or portion thereof).

Uplink Communication Link

Location tag 204 needs to transmit the location code that it has received from location transmitter 202. A suitable communication pathway may be formed by incorporating a RF chip set such that an IEEE 802.11, BLE, WiFi or any combination thereof is used to establish a communication link. In many offices, hospital or other similar environments, numerous 802.11 WiFi access points are preexisting and provide such coverage throughout the environment for which real-time location determination is desired. The WiFi network approach for uploading of the location code requires that location tag 204 be admitted to the WiFi network. As an alternative to location tag 204, a mobile communications device (for example, an iPhone or equivalent) may also be used to provide location determination of key personnel. Again, it is required that mobile communications device is admitted to the WiFi network. Mobile communications device offers an alternative uplink path for the location code in that mobile communications device may use a cellular connection to the server via the cloud. Such an alternative path is attractive in scenarios where mobile communications device is not admitted to the WiFi network. For example, in a shopping center or a hospital, mobile communications device may not be connected to the WiFi network.

In yet another alternative uplink scenario, location tags may use a short range RF link with another mobile device (e.g. smartphone, tablet, PC or smartwatch) and use this latter device as a gateway to convey its location information to a central server.

In various embodiments, a beacon device will send out an RF beacon signal (e.g., a short-range wireless signal, a BLE signal), and one or both acoustic signals at exemplary frequencies of 20 kHz and 40 kHz. The combination of both the RF beacon signal and the acoustic signals provide certain advantages for a real-time location system. The acoustic signals include the identification information (i.e., code) of the transmitting device. Identification of the transmitting device provides an indication of location since the acoustic waves diminish as distance from the transmitting device increases. However, the universe of possible codes may be large, which raises the difficulty of decoding the transmitted code, particularly in an environment having multiple echoes and other difficulties. The RF beacon signal may include an indication of the identity of the beacon device that in turn may be used to provide an indication of the subset of codes that are active in the local area. Thus, by virtue of the RF beacon signal, a mobile communications device (such as an iPhone or a location tag) may determine a course indication of its location and thereby be able to discern which subset of acoustic codes are in use in a particular area. Learning the subset of acoustic codes that are in use in a particular area thereby benefits the decoding process by reducing the universe of potential codes that are candidate codes for decoding.

The RF beacon signal may also provide timing information to the mobile communications device. The real-time location system has a reference clock that may be promulgated to the fixed transmitting devices. However, synchronization of the local clock in the mobile communications device is desirable, where synchronization means that the offset between the local clock and the reference clock is determined so that signals may be transmitted/received at agreed-upon times between the fixed transmitting devices and the mobile communications devices. Use of the RF beacon signal for synchronization of an iPhone or comparable device is therefore a desirable outcome, as other means for such synchronization are relatively difficult to achieve.

Synchronization of location tags is also desirable, since synchronization may be used to improve the power usage of the location tag, as well as to provide benefits in the location determination process. Power usage may be improved by timing synchronization of the location tag and the transmitting device such that the location tag awakens for a small agreed-upon time interval to receive the transmitted information. For example, the location tag may be time synchronized to awaken for a 10 msec time interval to receive signals during each 1 second time frame, and then go to sleep for the remainder of the time frame. Such synchronization may be achieved by using timing information in the RF beacon signal. The timing information in the RF beacon signal may also reduce the complexity of real-time location for the location tag. In a time of arrival system (ToA) like GPS, there are four unknowns: the three geometric dimensions of location (i.e., x, y, z) of the GPS device, together with the unknown timing offset between the local clock in the GPS device and that of the reference clock in the satellites in the GPS system. Those same principles apply to a real-time location system using acoustics. However, by providing timing information with the RF beacon signal, one of the four unknowns is resolved—thereby simplifying the complexity of the real-time location system by reducing the number of unknowns to three. In providing the timing information with the RF beacon signal, the RF transmission times are negligible compared to the acoustical timeframes relevant to the real-time location system.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A transmitting device associated with a real-time locating system, the transmitting device comprising:
    a first transducer configured to transmit acoustic signals having a first frequency, the acoustic signals including an identifying code of the transmitting device, wherein the identifying code represents a location of the transmitting device; and
    a beacon device configured to transmit beacon data via a short-range wireless communication technique, wherein the beacon data includes a time offset value and information that may be used by a receiving device in decoding the transmitted acoustic signals, the information describing a subset of identifying codes in use in a vicinity of the beacon device, wherein the identifying code is a member of the subset of identifying codes, and wherein the time offset value may be used by the receiving device to adjust its timing of receipt of either RF or acoustic receptions.

2. The transmitting device of claim 1, wherein the beacon data further includes timing information for timing synchronization of the receiving device.

3. The transmitting device of claim 2, further comprising:
    a second transducer configured to transmit second acoustic signals having a second frequency; and
    one or more control devices configured to select the first or second acoustic signals based at least in part on one or more operating capabilities of one or more mobile units associated with the real-time locating system, and to cause transmission of the selected acoustic signals and the beacon data.

4. The transmitting device of claim 3, wherein the first frequency is in a range of 19.5 kHz to 20.5 kHz, and the second frequency is in a range of 38 kHz to 42 kHz.

5. The transmitting device of claim 1, further comprising: a wireless receiver configured to receive control data from a server via an 802.15.4 protocol.

6. The transmitting device of claim 1, further comprising: a wireless receiver configured to receive control data from a server via a Long Range (LoRa) protocol that operates in a band at 868 MHz, or in a band in a range of 902 MHz to 928 MHz.

7. The transmitting device of claim 1, wherein the short-range wireless communication technique is a Bluetooth low energy protocol.

8. A method associated with a real-time locating system, the method comprising:
transmitting, by a first transducer, first acoustic signals having a first frequency, the first acoustic signals including an identifying code of a transmitting device, wherein the identifying code represents a location of the transmitting device;
transmitting, by a second transducer, second acoustic signals having a second frequency, the second acoustic signals including the identifying code of the transmitting device, wherein the identifying code represents the location of the transmitting device;
transmitting, by a beacon device, beacon data via a short-range wireless communication technique, wherein the beacon data includes a time offset value and information that may be used by a receiving device in decoding the transmitted acoustic signals, the information describing a subset of identifying codes in use in a vicinity of the beacon device, wherein the identifying code is a member of the subset of identifying codes, and wherein the time offset value may be used by the receiving device to adjust its timing of receipt of either RF or acoustic receptions; and
selecting, by one or more control devices, the first or second acoustic signals based at least in part on one or more operating capabilities of one or more mobile units associated with the real-time locating system, and causing transmission of the selected acoustic signals and the beacon data,
wherein the first transducer, the second transducer, the beacon device and the one or more control devices form a part of the real-time locating system.

9. The method of claim 8, wherein the first frequency is in a range of 19.5 kHz to 20.5 kHz, and the second frequency is in a range of 38 kHz to 42 kHz.

10. The method of claim 8, further comprising:
receiving, by a wireless receiver, control data from a server via an 802.15.4 protocol.

11. The method of claim 8, further comprising:
receiving, by a wireless receiver, control data from a server via a Long Range (LoRa) protocol.

12. The method of claim 11, wherein the LoRa protocol operates in a band at 868 MHz, or in a band in a range of 902 MHz to 928 MHz.

13. The method of claim 8, wherein a footprint of the first transducer and a footprint of the beacon device are matched in size.

14. The method of claim 8, wherein the short-range wireless communication technique is a Bluetooth low energy protocol.

15. A wireless communication device associated with a real-time locating system, the wireless communication device comprising:
a first transducer configured to receive first acoustic signals from a transmitting device, the first acoustic signals having a first frequency, and the first acoustic signals including an identifying code that represents a location of the transmitting device;
a first wireless receiver configured to receive beacon data from the transmitting device via a short-range wireless communication technique, wherein the beacon data includes a time offset value and information that is used by the wireless communication device in decoding the first acoustic signals, the information describing a subset of identifying codes in use in a vicinity of the transmitting device, and wherein the identifying code is a member of the subset of identifying codes, and wherein the time offset value may be used by the receiving device to adjust its timing of receipt of either RF or acoustic receptions; and
a wireless transmitter configured to transmit location information to a server via a wireless protocol.

16. The wireless communication device of claim 15, wherein the first frequency is in a range of 19.5 kHz to 20.5 kHz.

17. The wireless communication device of claim 15, wherein the first frequency is in a range of 39.5 kHz to 40.5 kHz.

18. The wireless communication device of claim 15, wherein the wireless protocol is an 802.11 wireless protocol.

19. The wireless communication device of claim 15, wherein the wireless protocol is a cellular protocol.

20. The wireless communication device of claim 15, wherein the short-range wireless communication technique is a Bluetooth low energy protocol.

* * * * *